(No Model.)
J. BAZANT, Jr.
VALVE STOPPER FOR BOTTLES.
No. 560,078.                    Patented May 12, 1896.
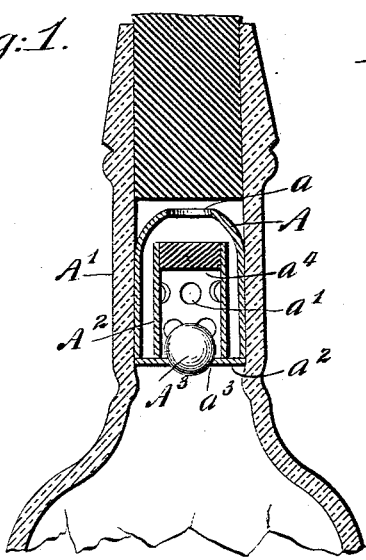
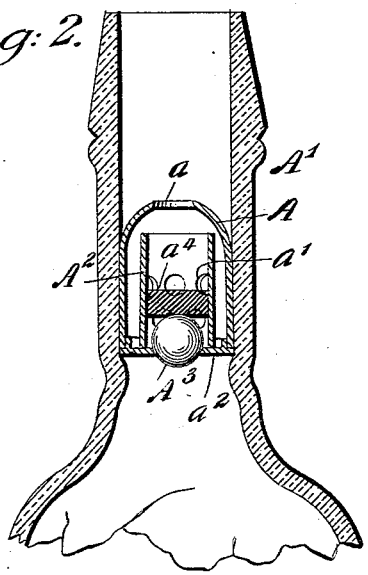
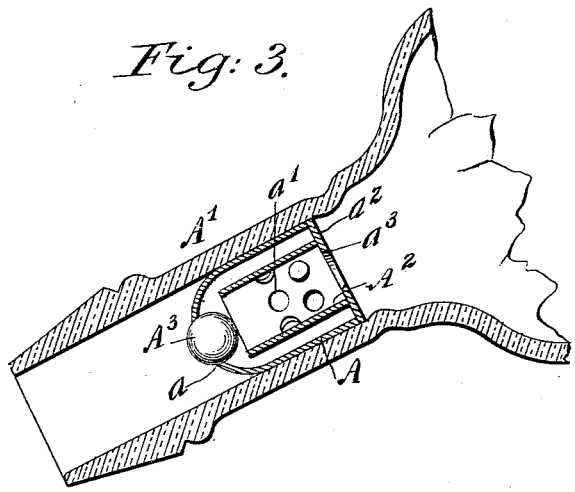
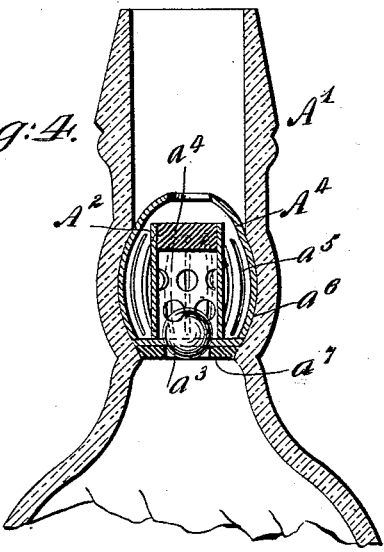
WITNESSES:
INVENTOR
J. Bazant Jr.
BY
Munn & Co.
ATTORNEYS.

UNITED STATES PATENT OFFICE.

JOHN BAZANT, JR., OF NEW YORK, N. Y.

VALVE-STOPPER FOR BOTTLES.

SPECIFICATION forming part of Letters Patent No. 560,078, dated May 12, 1896.

Application filed July 13, 1895. Serial No. 555,827. (No model.)

*To all whom it may concern:*

Be it known that I, JOHN BAZANT, Jr., of New York, in the county and State of New York, have invented certain new and useful Improvements in Valve-Stoppers for Bottles, of which the following is a full, clear, and exact description.

This invention relates to stoppers designed to be permanently attached within the neck of a bottle, the object being to provide a simple and comparatively cheap valve-stopper adapted to prevent the refilling of a bottle with liquid after it shall have been once emptied.

I will describe a device embodying my invention, and then point out the novel features in the appended claims.

Reference is to be had to the accompanying drawings, forming a part of this specification, in which similar characters of reference indicate corresponding parts in all the figures.

Figure 1 is a vertical section of a valve-stopper embodying my invention and showing its position in the neck of a bottle. Fig. 2 is a similar view, but showing the valve as locked by means of a movable closure or cork. Fig. 3 shows the position of the valve to prevent refilling should the cork be removed and the bottle tilted or inverted; and Fig. 4 is a vertical section showing a modification.

Referring first to the example of my improvement shown in Figs. 1, 2, and 3, A designates the outer shell or casing adapted to fit snugly within the neck A' of a bottle, and having its upper end curved or flanged inward and provided with an opening $a$ for the discharge of liquid from the bottle. Within the shell or casing A is a valve-casing $A^2$, the wall of which is provided with perforations $a'$. The parts A $A^2$ are connected at the bottom by an annular closure $a^2$, and the valve-casing is smaller in diameter or cross-section than the shell or casing A, forming a chamber to receive the liquid discharged from the perforations $a'$. The valve-casing $A^2$ has an opening $a^3$ in its lower end, providing communication with the interior of the bottle and forming a seat for the ball-valve $A^3$, and the upper end of the valve-casing is provided with a movable closure $a^4$ of suitable material—such, for instance, as cork. The ball-valve $A^3$ consists, preferably, of glass, porcelain, or similar material, and the parts A $A^2$ may be made of suitable thin metal or of a fictile material, such as glass or porcelain. In some instances I prefer to employ a fictile material for the parts A $A^2$, because it would be easily broken by an instrument inserted to remove it for the purpose of refilling the bottle, thus indicating that the bottle had been tampered with. As will be seen in the drawings, the space between the upper end of the valve-casing and the curved wall of the outer casing is much less than the thickness of the closure $a^4$, so that the closure cannot be wholly withdrawn from the valve-casing, and it also will be seen that should the closure be broken in pieces and drawn out through the opening $a$ the bottle cannot be refilled when tilted, because the ball will roll into the opening $a$, which forms a seat therefor, as indicated in Fig. 3, and effectually close the opening. Should the cork be forced downward on the ball-valve the valve will be firmly held in the seat $a^3$, as indicated in Fig. 2, and thus prevent the refilling of the bottle. As the valve-casing is somewhat larger in diameter than the opening $a$ a wire cannot be inserted to lift and support the ball-valve to allow the refilling of the bottle.

In the example of my improvement shown in Fig. 4 the outer shell or casing $A^4$, which in this case consists of soft or yielding metal, is bulged outward, and is provided with longitudinal slits or kerfs $a^5$, thus forming a series of parallel strips that may be forced outward to engage in a concaved portion $a^6$, formed in the neck of the bottle, thus serving as a lock to prevent the withdrawal of the device. With this device a cork washer $a^7$ may be seated in the lower portion of the concavity $a^6$ and form a base for the casing to rest upon. This cork will swell by moisture and serve to crowd the outer shell or casing closely against the interior of the bottle-neck.

Having thus described my invention, I claim as new and desire to secure by Letters Patent—

1. A valve-stopper for bottles comprising an outer shell having its upper end turned inward and provided with an outlet-opening, a valve-casing in the outer shell having a valve-opening in its lower end and having perforations in its wall, a ball-valve in the casing and a movable closure in the upper end of the valve-casing, the said closure being of greater diameter than the opening through the outer shell and having a thickness greater than the space between the upper end of the valve-casing and the upper end wall of the outer casing so that the closure cannot be wholly withdrawn from the valve-casing, substantially as specified.

2. A valve-stopper for bottles comprising an outer shell or casing longitudinally kerfed forming strips adapted to be forced outward to engage in a concaved depression formed in the neck of a bottle, a valve-casing in the outer shell having a valve-seat in its lower end, perforations in its side, and a closed top, and a ball-valve in the valve-casing, substantially as specified.

JOHN BAZANT, Jr.

Witnesses:
JNO. M. RITTER,
CLARENCE R. FERGUSON.